(12) United States Patent
Oami et al.

(10) Patent No.: US 9,761,248 B2
(45) Date of Patent: Sep. 12, 2017

(54) ACTION ANALYSIS DEVICE, ACTION ANALYSIS METHOD, AND ACTION ANALYSIS PROGRAM

(71) Applicant: NEC Corporation, Tokyo (JP)

(72) Inventors: Ryoma Oami, Tokyo (JP); Hiroyoshi Miyano, Tokyo (JP); Takafumi Koshinaka, Tokyo (JP); Osamu Houshuyama, Tokyo (JP); Masahiro Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/786,931

(22) PCT Filed: Mar. 26, 2014

(86) PCT No.: PCT/JP2014/001745
§ 371 (c)(1),
(2) Date: Oct. 23, 2015

(87) PCT Pub. No.: WO2014/174760
PCT Pub. Date: Oct. 30, 2014

(65) Prior Publication Data
US 2016/0078883 A1   Mar. 17, 2016

(30) Foreign Application Priority Data
Apr. 26, 2013   (JP) .................................. 2013-093215

(51) Int. Cl.
*G10L 21/00*   (2013.01)
*H04N 7/18*   (2006.01)
(Continued)

(52) U.S. Cl.
CPC .......... *G10L 25/57* (2013.01); *G06K 9/00778* (2013.01); *H04N 7/188* (2013.01); *H04N 21/4394* (2013.01)

(58) Field of Classification Search
USPC ..... 704/270, 500; 725/135; 348/14.1, 231.4, 348/143, 169, 157, 193, 512; 715/765;
(Continued)

(56) References Cited

U.S. PATENT DOCUMENTS 5,231,492 A * 7/1993 Dangi ................. H04B 14/046
348/14.1
8,009,966 B2 * 8/2011 Bloom ................. G11B 27/034
386/285
(Continued)

FOREIGN PATENT DOCUMENTS

JP   2000-217095   8/2000
JP   2002-314987   10/2002
(Continued)

OTHER PUBLICATIONS

International Search Report and Written Opinion of ISA mailed Jul. 1, 2014 in corresponding PCT International Application.

*Primary Examiner* — Neeraj Sharma
(74) *Attorney, Agent, or Firm* — Finnegan, Henderson, Farabow, Garrett & Dunner, L.L.P.

(57) ABSTRACT

An action analysis device includes: an acoustic analysis unit 1 for analyzing input acoustic information, and generating acoustic analysis information indicating a feature of the acoustic information; a time difference determination unit 2 for determining a time difference between when an acoustic event identified by the acoustic analysis information occurs and when an event corresponding to the acoustic event occurs in input video obtained by capturing an image of a crowd; and an action analysis unit 3 for analyzing an action of the crowd corresponding to the acoustic event, using the input video, the acoustic analysis information, and the time difference.

11 Claims, 3 Drawing Sheets

(51) Int. Cl.
 *G10L 25/57* (2013.01)
 *H04N 21/439* (2011.01)
 *G06K 9/00* (2006.01)
 *G10L 15/00* (2013.01)
 *H04N 5/225* (2006.01)
 *H04N 17/00* (2006.01)
 *H04N 9/475* (2006.01)
 *H04N 7/16* (2011.01)
 *G06F 3/048* (2013.01)
 *G06F 17/00* (2006.01)

(58) Field of Classification Search
 USPC .................................................. 463/20
 See application file for complete search history.

(56) References Cited

U.S. PATENT DOCUMENTS

| | | | | |
|---|---|---|---|---|
| 9,094,615 | B2* | 7/2015 | Aman | G01S 3/7864 |
| 2005/0219366 | A1* | 10/2005 | Hollowbush | H04N 17/004 |
| | | | | 348/193 |
| 2006/0156374 | A1* | 7/2006 | Hu | H04N 7/163 |
| | | | | 725/135 |
| 2007/0129952 | A1* | 6/2007 | Kenyon | G06K 9/0055 |
| | | | | 704/500 |
| 2009/0207277 | A1* | 8/2009 | Kurihara | H04N 5/232 |
| | | | | 348/231.4 |
| 2010/0105464 | A1* | 4/2010 | Storm | G06Q 10/04 |
| | | | | 463/20 |
| 2012/0194737 | A1* | 8/2012 | Cafarella | G10L 25/48 |
| | | | | 348/512 |
| 2013/0162852 | A1* | 6/2013 | Boyle | H04N 5/23203 |
| | | | | 348/211.99 |
| 2013/0212507 | A1* | 8/2013 | Fedoseyeva | G06Q 10/00 |
| | | | | 715/765 |
| 2014/0055610 | A1* | 2/2014 | Ko | G06K 9/00771 |
| | | | | 348/143 |
| 2014/0240546 | A1* | 8/2014 | Okamoto | H04N 5/772 |
| | | | | 348/231.99 |

FOREIGN PATENT DOCUMENTS

| | | |
|---|---|---|
| JP | 2004-139261 | 5/2004 |
| JP | 2007-228459 | 9/2007 |
| JP | 4506381 | 7/2010 |
| JP | 2010-232888 | 10/2010 |
| WO | WO 02/21441 A1 | 3/2002 |

\* cited by examiner

ACTION ANALYSIS DEVICE, ACTION ANALYSIS METHOD, AND ACTION ANALYSIS PROGRAM

CROSS-REFERENCE TO RELATED PATENT APPLICATIONS

This application is a National Stage Entry of International Application No. PCT/JP2014/001745, filed Mar. 26, 2014, which claims priority from Japanese Patent Application No. 2013-093215, filed Apr. 26, 2013. The entire contents of the above-referenced applications are expressly incorporated herein by reference.

TECHNICAL FIELD

The present invention relates to an action analysis device, action analysis method, and action analysis program for performing video monitoring using video information and acoustic information.

BACKGROUND ART

There are techniques of monitoring persons and the like using acoustic information and video information. An example is a method of detecting a specific speech pattern from a speech signal and acquiring an image of the surroundings where the speech signal is acquired and processing the image by enlargement, filtering, interpolation, or the like or generating a stereoscopic image of the surroundings where the speech signal is acquired, thus facilitating identification of any abnormality (for example, see Patent Literature (PTL) 1). Another example is a method of recording sounds generated in a monitoring area and images of chief locations using acoustic sensors and image sensors, detecting a specific event by analyzing acoustic data, tracking a mobile object based on the detection result, acquiring image data of the mobile object, and performing image analysis (for example, see PTL 2). The methods described in PTL 1 and PTL 2 are both techniques of, when triggered by speech or sound, performing other image processing.

These methods are not intended to analyze the action of a crowd (hereafter referred to as "crowd action"). The crowd mentioned here is a collection of individuals subjected to action analysis. As a method intended to analyze crowd action, there is a method of determining whether an event involves a single person or a group of people and what the event is (a fight, a crime, etc.) by acoustic analysis and image analysis (for example, see PTL 3).

CITATION LIST

Patent Literature(s)

PTL 1: Japanese Patent Application Laid-Open No. 2000-217095
PTL 2: Japanese Patent Application Laid-Open No. 2002-314987
PTL 3: Japanese Patent No. 4506381

SUMMARY OF INVENTION

Technical Problem

With the method described in PTL 3, acoustic analysis and image analysis are performed independently of each other, and both analysis results are integrated without taking into consideration the time difference between an acoustic event and a video event. The acoustic event mentioned here is an event extracted from speech or sound received by a microphone. Examples of the acoustic event include an impact sound such as an explosion sound or a gunshot sound, and a person's screaming. The video event mentioned here is an event extracted from video captured by a camera. Examples of the video event include a crowd's movement.

Thus, with the method described in PTL 3, the acoustic analysis result and the image analysis result can be integrated in the case where the acoustic event and the video event occur simultaneously. In the case where there is a time difference between the acoustic event and the video event, however, the two analysis results may not be able to be integrated correctly, which makes it impossible to properly analyze the crowd action and the like. For example, in the case where an impact sound is generated and after a short while a crowd runs away, there is a time difference between the acoustic event and the video event. The method described in PTL 3 has difficulty in effectively analyzing the crowd action in such a case.

The present invention accordingly has an object of providing an action analysis device, action analysis method, and action analysis program capable of analyzing crowd action more accurately even in the case where there is a time difference between an acoustic event and a video event.

Solution to Problem

An action analysis device according to the present invention includes: an acoustic analysis which analyzes input acoustic information, and generates acoustic analysis information indicating a feature of the acoustic information; a time difference determination unit which determines a time difference between when an acoustic event identified by the acoustic analysis information occurs and when an event corresponding to the acoustic event occurs in input video obtained by capturing an image of a crowd; and an action analysis unit which analyzes an action of the crowd corresponding to the acoustic event, using the input video, the acoustic analysis information, and the time difference.

An action analysis method according to the present invention includes: analyzing input acoustic information, and generating acoustic analysis information indicating a feature of the acoustic information; determining a time difference between when an acoustic event identified by the acoustic analysis information occurs and when an event corresponding to the acoustic event occurs in input video obtained by capturing an image of a crowd; and analyzing an action of the crowd corresponding to the acoustic event, using the input video, the acoustic analysis information, and the time difference.

An action analysis program according to the present invention causes a computer to execute: a process of analyzing input acoustic information, and generating acoustic analysis information indicating a feature of the acoustic information; a process of determining a time difference between when an acoustic event identified by the acoustic analysis information occurs and when an event corresponding to the acoustic event occurs in input video obtained by capturing an image of a crowd; and a process of analyzing an action of the crowd corresponding to the acoustic event, using the input video, the acoustic analysis information, and the time difference.

Advantageous Effects of Invention

According to the present invention, crowd action can be analyzed more accurately even in the case where there is a time difference between an acoustic event and a video event.

DESCRIPTION OF EMBODIMENT(S)

Exemplary Embodiment 1

The following describes Exemplary Embodiment 1 of the present invention with reference to drawings.

Figure 1:
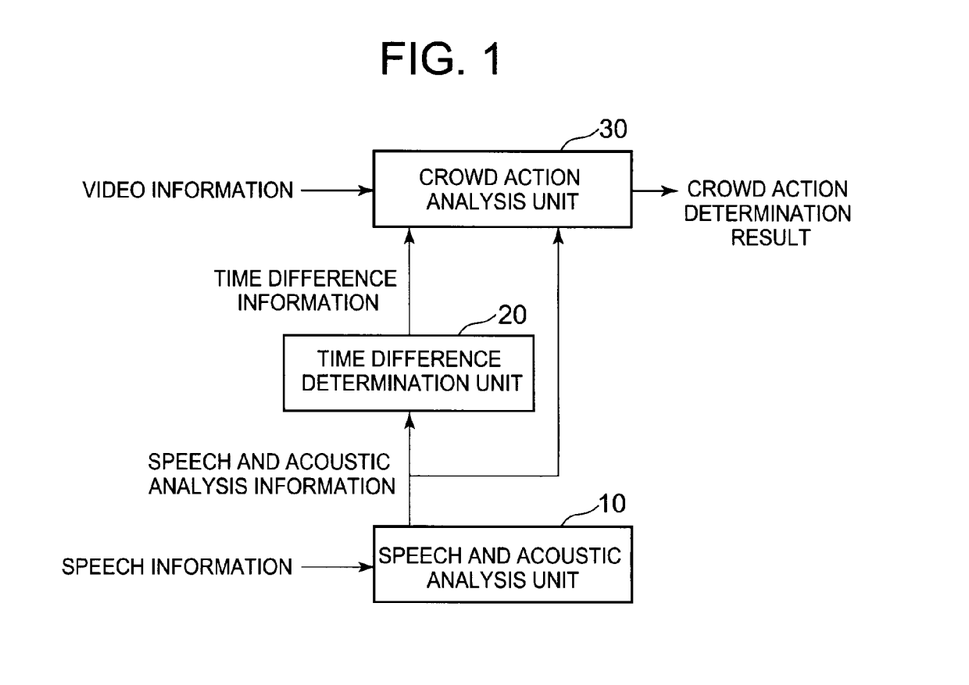
FIG. 1 It is a block diagram depicting the structure of Exemplary Embodiment 1 of an action analysis device according to the present invention.

FIG. 1 is a block diagram depicting the structure of Exemplary Embodiment 1 of an action analysis device according to the present invention.

The action analysis device includes a speech and acoustic analysis unit 10, a time difference determination unit 20, and a crowd action analysis unit 30, as depicted in FIG. 1.

The speech and acoustic analysis unit 10 receives speech and acoustic information (hereafter simply referred to as "acoustic information"). The acoustic information is information including one or more persons' speech or ambient sound. In this exemplary embodiment, the speech and acoustic analysis unit 10 receives a speech and acoustic signal (hereafter simply referred to as "acoustic signal") via a microphone. Any number of microphones may be connected to the action analysis device.

The speech and acoustic analysis unit 10 analyzes the acoustic signal. The speech and acoustic analysis unit 10 generates speech and acoustic analysis information (hereafter simply referred to as "acoustic analysis information") indicating the analysis result of the acoustic signal, for example, a feature value (hereafter referred to as "acoustic feature value") extracted from the acoustic signal.

The time difference determination unit 20 receives the acoustic analysis information from the speech and acoustic analysis unit 10.

The time difference determination unit 20 determines the positions of the microphone and camera and the time difference between an acoustic event and a video event, and generates time difference information indicating the time difference.

The crowd action analysis unit 30 receives video information. In this exemplary embodiment, the crowd action analysis unit 30 receives video information via a camera. Any number of cameras may be connected to the action analysis device. The crowd action analysis unit 30 may receive a plurality of pieces of video information from one camera.

The crowd action analysis unit 30 analyzes crowd action based on the video information received from the camera, the time difference information received from the time difference determination unit 20, and the acoustic analysis information received from the speech and acoustic analysis unit 10, and generates an analysis result (hereafter referred to as "crowd action determination result"). The crowd subjected to action analysis includes not only persons themselves but also, for example, persons moving by car, motorcycle, bicycle, and the like.

Figure 2:
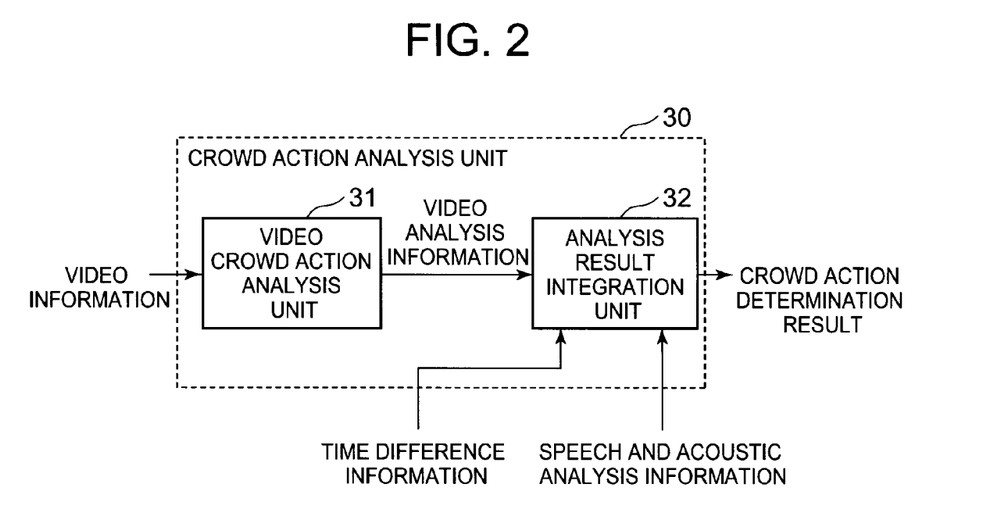
FIG. 2 It is a block diagram depicting the structure of a crowd action analysis unit in Exemplary Embodiment 1.

The crowd action analysis unit 30 in this exemplary embodiment includes a video crowd action analysis unit 31 and an analysis result integration unit 32, as depicted in FIG. 2. FIG. 2 is a block diagram depicting the structure of the crowd action analysis unit in Exemplary Embodiment 1.

The video crowd action analysis unit 31 analyzes crowd action from video captured by the camera, and generates video analysis information indicating the analysis result, for example, a feature value (hereafter referred to as "video feature value") extracted from the video.

The analysis result integration unit 32 integrates the acoustic analysis information and the video analysis information in consideration of the time difference indicated by the time difference information, and determines crowd action based on the integration result.

The analysis result integration unit 32 generates the crowd action determination result including the determination result, and outputs the crowd action determination result.

The speech and acoustic analysis unit 10, the time difference determination unit 20, and the crowd action analysis unit 30 are, for example, realized by a computer operating according to an action analysis program. In this case, a CPU reads the action analysis program and, according to the program, operates as the speech and acoustic analysis unit 10, the time difference determination unit 20, and the crowd action analysis unit 30. Alternatively, the speech and acoustic analysis unit 10, the time difference determination unit 20, and the crowd action analysis unit 30 may be realized by separate hardware.

The following describes the operation in this exemplary embodiment.

The speech and acoustic analysis unit 10 analyzes the acoustic signal received via the microphone. Here, the speech and acoustic analysis unit 10 analyzes an acoustic feature such as the loudness or type of the sound. The speech and acoustic analysis unit 10 outputs the acoustic analysis information including the analysis result to the time difference determination unit 20.

The time difference determination unit 20 receives the acoustic analysis information, and determines the time lag (time difference) between the acoustic event identified from the acoustic feature value indicated by the acoustic analysis information and the video event. In other words, the time difference determination unit 20 determines the time difference between the detection time of abnormality in the acoustic information and the detection time of abnormality in the video information.

In detail, the time difference determination unit 20 first determines the distance between the position where the acoustic event occurs and the position where the video event is identified. In this exemplary embodiment, the position where the acoustic event occurs is the position where the acoustic information is acquired, i.e. the installation position of the microphone. Meanwhile, the position where the video event is identified is the imaging area of the camera, i.e. the position monitored by the camera. Hereafter, the distance between the position where the acoustic event occurs and the position where the video event is identified is simply referred to as the "distance between the microphone and the camera".

After determining the distance between the microphone and the camera, the time difference determination unit 20 determines the time difference of abnormality between the acoustic information and the video information based on the distance, and generates the time difference information indicating the time difference.

The time difference determination unit 20 holds time difference modeling information beforehand. The time difference modeling information is information of modeling the time difference between when the acoustic event occurs and when its influence appears in the video captured by the camera (i.e. the time difference between when the acoustic event occurs and when the video event occurs), depending on the distance between the microphone and the camera.

A time difference assumed beforehand from the distance between the microphone and the camera is set in the time difference modeling information. A time difference learned from past events and the like may be set in the time difference modeling information. A time difference determined heuristically may be set in the time difference modeling information. For example, the time difference modeling information is one or more parameters of a formula for calculating the time difference depending on the distance or a lookup table describing the relationship between the distance and the time difference in table form.

Here, the time difference may be modeled based on not only the distance but also an acoustic feature such as the loudness or frequency of sound. The time difference may be, for example, modeled as follows: From the loudness or frequency of sound such as an explosion sound, the range within which the sound can be directly heard is estimated, and the time difference is decreased in the case where the distance between the microphone and the camera is within the range and increased in the case where the distance is not within the range. For example, in the case where the sound received by the microphone is a loud sound that travels far such as an explosion sound or a sound that contains many high-frequency components and rings out far, the time difference determination unit 20 sets the time difference determined from the distance between the microphone and the camera, to a smaller value. In this case, the time difference modeling information is one or more parameters of a formula (or a mathematical model) whose input variables are the distance and the acoustic feature. In this way, the time difference determination unit 20 can calculate the time difference between the acoustic event and the video event more accurately, based on the loudness or type of the sound indicated by the acoustic analysis information. The time difference determination unit 20 can thus determine the time difference in consideration of the loudness or type of the sound received by the microphone.

The time difference determination unit 20 may calculate the time difference not as a single value but as a distribution having a predetermined width, in view of the possibility that the time difference estimate varies to a certain extent. In detail, for example, there is the following tendency: When the loudness of the sound is high, the accuracy of estimation of the time difference is high and so the width of estimation of the time difference is small, whereas when the loudness of the sound is low, the accuracy of estimation is low and so the width of estimation of the time difference is large. The accuracy of estimation of the time difference also tends to be lower when the distance between the camera and the microphone is larger. In consideration of these tendencies, the time difference determination unit 20 outputs the time difference as a distribution. For example, the time difference determination unit 20 sets the distribution of the time difference $\tau$ as $q(\tau)$, and generates information describing (indicating) the distribution $q(\tau)$ as the time difference information. In the case where $q(\tau)$ can be approximated by a normal distribution, for example, the time difference determination unit 20 outputs the expected value (average value) and variance of $\tau$ as the time difference information. The distribution form of $q(\tau)$ is not limited to a normal distribution, and distributions such as a Brownian passage time (BPT) distribution may be used for $q(\tau)$.

Thus, the time difference determination unit 20 determines the time difference using both the distance between the microphone and the camera and the acoustic analysis result. The time difference determination unit 20 outputs the time difference information to the analysis result integration unit 32 in the crowd action analysis unit 30.

The analysis result integration unit 32 receives the acoustic feature value used to analyze the acoustic abnormal state, from the speech and acoustic analysis unit 10. The analysis result integration unit 32 also receives the video feature value used to analyze the abnormal state of the crowd from the video, from the video crowd action analysis unit 31. The analysis result integration unit 32 integrates the acoustic feature value and the video feature value, in consideration of the time difference indicated by the time difference information.

For example, as the probability determined from the acoustic feature indicated by the acoustic feature value, the probability of occurrence of an event at time t is denoted by Pa(t). The value of Pa(t) can be formulated as follows, where N is the number of acoustic feature values used and $a_i(t)$ (i=1, . . . , N) is the value of the i-th acoustic feature value at time t.

$$P_a(t)=G_a(a_1(t),a_2(t),\ldots,a_N(t)) \qquad \text{[Math. 1]}$$

Here, the function $G_a$ is a function of estimating the probability of occurrence of an event from the value of each acoustic feature value. The function $G_a$ can be modeled by learning each acoustic feature value extracted from both data of abnormal sound to be detected and other sound. Alternatively, the model of the function $G_a$ may be determined heuristically. Likewise, as the probability determined from the video feature indicated by the video feature value, the probability of occurrence of an event at time t is denoted by Pv(t). The value of Pv(t) can be formulated as follows, where M is the number of video feature values used and $v_j(t)$ (j=1, . . . , M) is the value of the j-th video feature value at time t.

$$P_v(t)=G_v(v_1(t),v_2(t),\ldots,v_M(t)) \qquad \text{[Math. 2]}$$

Here, the function $G_v$ is a function of estimating the probability of occurrence of an event from the value of each video feature value. The function $G_v$ can be modeled by learning each video feature value extracted from both data of video data of an abnormal state to be detected and other video data. Alternatively, the model of the function $G_v$ may be determined heuristically. In this case, the analysis result integration unit 32 calculates the probability P(t) of occurrence of an event at time t, using the following formula.

$$P(t)=P_a(t-\tau)P_v(t) \qquad \text{[Math. 3]}$$

Here, $\tau$ is the time difference indicated by the time difference information, i.e. the time lag between the acoustic event and the video event. The analysis result integration unit 32 thus integrates Pa(t) and Pv(t) in consideration of the time difference indicated by the time difference information. Alternatively, the analysis result integration unit 32 may directly calculate the value of P(t) from the acoustic feature value and the video feature value without calculating Pa(t) and Pv(t), using the following formula.

$$P(t)=G(a_1(t-\tau),a_2(t-\tau),\ldots,a_N(t-\tau),v_1(t),\\v_2(t),\ldots,v_M(t))\qquad\text{[Math. 4]}$$

Here, the function G is a function of estimating the probability of occurrence of an event from each acoustic feature value and each video feature value. Alternatively, in the case where the distribution $q(\tau)$ of the time difference $\tau$ is given, the probability of occurrence of an event at time t is defined by the following formula.

$$P(t)=\int P_a(t-\tau)P_v(t)q(\tau)d\tau\qquad\text{[Math. 5]}$$

In this case, too, the analysis result integration unit 32 may directly calculate the value of P(t) without calculating Pa(t) and Pv(t), using the following formula.

$$P(t)=\int G(a_1(t-\tau),a_2(t-\tau),\ldots,a_N(t-\tau),v_1(t),\\v_2(t),\ldots,v_M(t))q(\tau)d\tau\qquad\text{[Math. 6]}$$

Examples of the acoustic feature value include a mel-frequency cepstrum coefficient (MFCC), fast Fourier transform (FFT), and wavelet transform coefficient extracted by converting the acoustic signal. Other examples of the acoustic feature value include the absolute value of the sound volume, the amount of sound change (secondary difference), the arrival direction of the sound, and the speech recognition result of a specific keyword (the probability of recognition, the frequency of recognition, the number of persons uttering the specific keyword, etc.).

Examples of the video feature value include optical flow (information indicating apparent movement) in the video, a direction or intensity histogram obtained by accumulating optical flow, a histogram obtained by accumulating and multiplexing optical flow with various time widths, i.e. a histogram calculated with multiple time resolution, and a person detection result.

The analysis result integration unit 32 detects the abnormal state of the crowd, from the integration result of the acoustic feature value and the video feature value. For example, the analysis result integration unit 32 determines that the abnormal state of the crowd has occurred, when the value of P(t) exceeds a preset threshold. The abnormal state mentioned here is a state that is not steady.

The analysis result integration unit 32 outputs the crowd action determination result. In this exemplary embodiment, the analysis result integration unit 32 outputs the crowd action determination result not during normal time but only when detecting a predetermined state to be detected, i.e. an abnormal situation. Alternatively, the analysis result integration unit 32 may output the crowd action determination result indicating that the situation is normal, i.e. no abnormal state is detected, during normal time.

The crowd action determination result includes, for example, the location where the abnormal action of the crowd is detected (e.g. the position monitored by the camera), the detection time, information indicating the type of the abnormal action (e.g. a preset event ID), a value indicating the degree of abnormal action, and an event determination score (likelihood) indicating the probability of event determination. The crowd action determination result may also include information of the video when the abnormal action is detected and the area in which the event is detected in the video (e.g. in the case where a specific person is running fast, the location of the person shown in the video).

Examples of the type of the abnormal action are as follows:

(1) occurrence of an abnormal situation such as an explosion or fire;

(2) occurrence of an incident such as theft or injury; and (3) other actions.

In the case where the type of the abnormal action is (1), the analysis result integration unit 32 further reclassifies the abnormal action into an explosion, fire, a random street assault, and other vicious crimes, using the speech recognition result and the acoustic type determination result.

In the case where the type of the abnormal action is (2), the analysis result integration unit 32 further reclassifies the abnormal action into theft, injury, and the like, using the speech recognition result.

The abnormal action of the type (3) is some kind of abnormal action that has been detected but does not correspond to any of (1) and (2). In this exemplary embodiment, an index indicating the seriousness of the situation, such as a level, has been set beforehand as the degree of abnormal action. The analysis result integration unit 32 determines the level from the moving speed of one or more persons, the number of persons running away, the loudness of the voice at the time, and the like, and includes the determination result in the crowd action determination result. A determinator for outputting a level value based on each input feature value may be generated beforehand by regression learning or the like, with the analysis result integration unit 32 determining the level using the determinator.

The analysis result integration unit 32 may include additional information according to the event type, in the crowd action determination result. For example, in the case where the type of the abnormal action is (1), the analysis result integration unit 32 may include information of the moving direction of the crowd and the congestion situation in the crowd action determination result. In the case where the type of the abnormal action is (2), the analysis result integration unit 32 may include the personal feature (e.g. cloths and the like), moving direction, and speed of a possible suspect taking the abnormal action, in the crowd action determination result. If the person goes outside the field of view, the analysis result integration unit 32 may include the time and the direction in the crowd action determination result.

The analysis result integration unit 32 may notify a security office of the crowd action determination result as an alert. The analysis result integration unit 32 may include an instruction to execute a predetermined operation, in the crowd action determination result. Hence, for example when the abnormal situation of (1) occurs, the analysis result integration unit 32 can output the crowd action determination result to, for example, a device for controlling an emergency door so that an emergency exit is opened or a sign of route guidance to the emergency exit is provided. When the incident of (2) occurs, the analysis result integration unit 32 can predict, from the moving direction, the speed, the time at which the person goes outside the field of view, and the like, a camera that is likely to capture the possible suspect next, and output the crowd action determination result to the camera so that the image of the camera is output to a display device in the security office. The analysis result integration unit 32 can also control the direction, zoom factor, etc. of the camera to facilitate the capturing of the face of the possible suspect. When the possible suspect appears, the analysis result integration unit 32 may perform personal feature-based matching and, in the case of determining that the person is highly likely to be the same person as the suspect, cause the camera to keep tracking the person.

As described above, in this exemplary embodiment, the abnormal state of the crowd is determined from the result of integrating the acoustic analysis result and the video analysis result in consideration of the time difference by the analysis result integration unit 32. Accordingly, even in the case where the time at which abnormality is detected in the acoustic information and the time at which abnormality is detected in the video information are different, the abnormal action of the crowd can be detected reliably. This enables more accurate analysis of the crowd action.

For example, an impact sound such as an explosion sound or a gunshot sound is detected before the abnormal state of the crowd is detected from video. According to this exemplary embodiment, the abnormal state of the crowd can be accurately detected even in such a case. With the method of integrating the acoustic analysis result and the video analysis result without taking the time difference into consideration as described in PTL 3, on the other hand, it may be impossible to correctly determine the abnormality of the crowd action.

Moreover, in this exemplary embodiment, the time difference determination unit 20 takes into consideration the positions of the microphone and camera, upon determining the time difference between the acoustic event and the video event. For example, in the case where there is a certain distance between the microphone for acoustic analysis and the camera for crowd action analysis, the time taken for moving the distance can be added to the time difference. Thus, the abnormal action of the crowd can be accurately detected regardless of the installation positions of the microphone and camera.

Moreover, in this exemplary embodiment, the time difference determination unit 20 takes into consideration the loudness or type of the sound received by the microphone, upon determining the time difference between the acoustic event and the video event. As a result, the time difference determined from the distance between the microphone and the camera can be updated more optimally based on the loudness or type of the sound.

Exemplary Embodiment 2

The following describes Exemplary Embodiment 2 of the present invention with reference to drawings.

The structure of Exemplary Embodiment 2 of the action analysis device is the same as that of Exemplary Embodiment 1.

Figure 3:
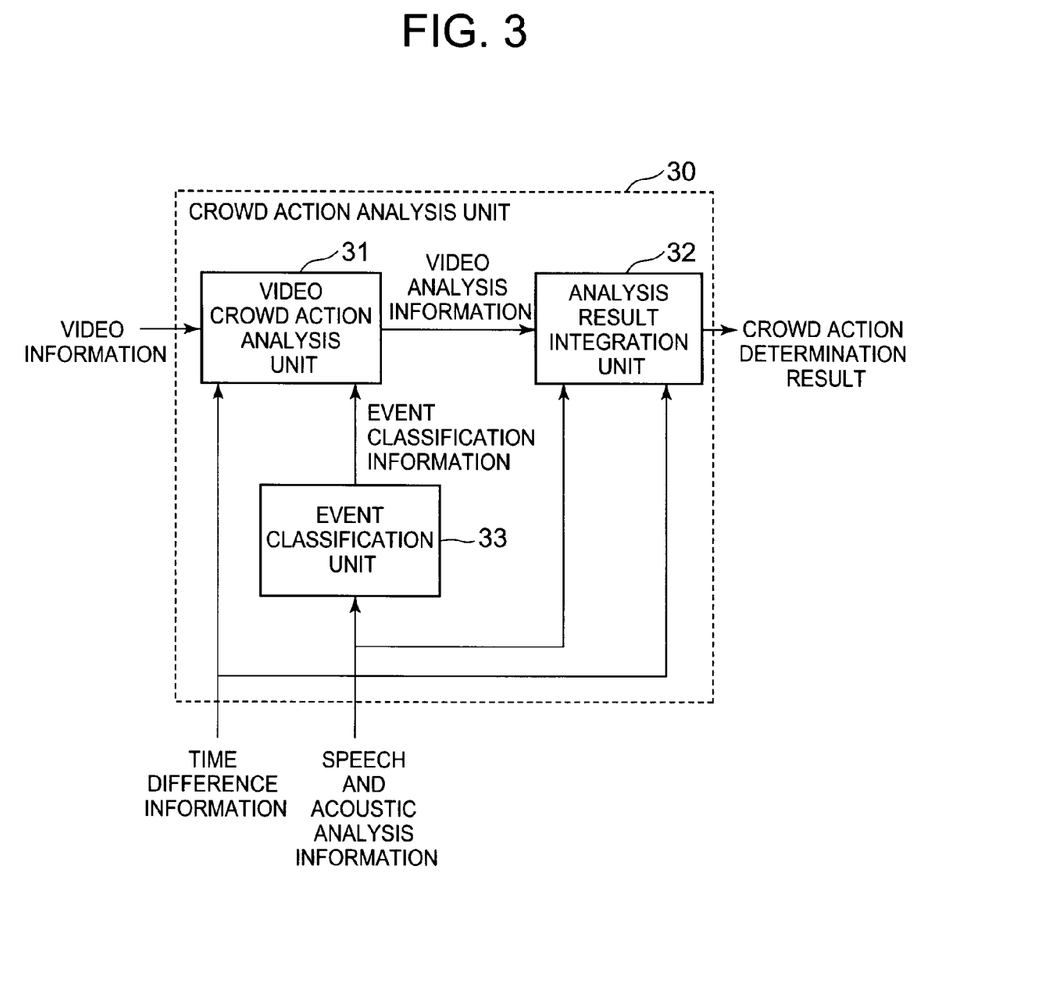
FIG. 3 It is a block diagram depicting the structure of a crowd action analysis unit in Exemplary Embodiment 2.

In this exemplary embodiment, the crowd action analysis unit 30 includes an event classification unit 33 in addition to the video crowd action analysis unit 31 and the analysis result integration unit 32, as depicted in FIG. 3. FIG. 3 is a block diagram depicting the structure of the crowd action analysis unit in Exemplary Embodiment 2.

The event classification unit 33 receives the acoustic analysis information. The event classification unit 33 classifies the event based on the acoustic analysis information, and generates event classification information including the classification result. The event classification information is used to control the video crowd action analysis in the video crowd action analysis unit 31.

The video crowd action analysis unit 31 adjusts one or more parameters of video crowd action analysis or switches an algorithm of video crowd action analysis, based on the event classification information generated by the event classification unit 33. Here, the video crowd action analysis unit 31 adjusts the parameters or switches the algorithm in consideration of the time difference determined by the time difference determination unit 20. The video crowd action analysis unit 31 needs to complete the adjustment of the parameters or the switching of the algorithm, within the period from when the acoustic event occurs to when the video event occurs. Accordingly, for example in the case of determining that the adjustment of the parameters or the switching of the algorithm cannot be executed within the time difference determined by the time difference determination unit 20, the video crowd action analysis unit 31 simplifies or suppresses the adjustment of the parameters or the switching of the algorithm. As an example, suppose the algorithm is to be switched to such an algorithm that needs a certain amount of image learning at the start. In the case of determining that the time required for the learning exceeds the time difference, the video crowd action analysis unit 31 does not switch to the algorithm. As another example, suppose the allocation of computational resources to a plurality of cameras is designated. In the case of determining that the time required to actually change the allocation of computational resources is not less than the time difference, the video crowd action analysis unit 31 does not change the allocation of computational resources or performs simpler adjustment of computational resources.

The video crowd action analysis unit 31 analyzes the crowd action in the video, using the adjusted parameters or the switched algorithm. The video crowd action analysis unit 31 outputs information obtained as a result of the analysis, as video analysis information.

The analysis result integration unit 32 integrates the acoustic analysis information and the video analysis information in consideration of the time difference, and determines the crowd action based on the integration result, as in Exemplary Embodiment 1.

The following describes the operation in this exemplary embodiment.

The video crowd action analysis unit 31, upon receiving the time difference information, determines that abnormality is detected from the acoustic information. In other words, in this exemplary embodiment, the speech and acoustic analysis unit 10 outputs the acoustic analysis information to the time difference determination unit 20 when detecting abnormality from the acoustic information. Having received the acoustic analysis information, the time difference determination unit 20 outputs the time difference information to the video crowd action analysis unit 31.

The speech and acoustic analysis unit 10 simultaneously outputs the acoustic analysis information to the event classification unit 33.

The event classification unit 33 classifies the event type of the crowd action, generates the event classification information indicating the classification result, and outputs the event classification information to the video crowd action analysis unit 31.

In the case of analyzing crowd action using video, the crowd action to be analyzed can be classified into: a situation (hereafter, case A) where ordinary people run away in a group as in the case of a terrorist attack; and a situation (hereafter, case B) where a specific person (suspect) runs away through a crowd as in the case of a purse snatching. The event classification unit 33 classifies the event into these cases using the acoustic information, and the video crowd action analysis unit 31 controls the video-based crowd action analysis based on the classification information. Note that the crowd action to be analyzed is not limited to case A and case B. The crowd action to be analyzed may be classified into any number of cases.

For example, in the case where, when an event occurs, the feature of the scream at the scene is analyzed and as a result it is revealed that a plurality of persons are screaming, the event classification unit 33 determines the event as case A. In the case where it is revealed that a single person or a few persons are screaming, on the other hand, the event classification unit 33 determines the event as case B.

Here, the speech and acoustic analysis unit 10 may perform speech recognition on the scream, with the event classification unit 33 analyzing the utterance to distinguish between the two cases. In the case where an explosion sound or a gunshot sound is detected, the event classification unit 33 may determine the event as case A. The determination does not need to be a binary decision. For example, the event classification unit 33 may calculate likelihood indices indicating the likelihood of case A and the likelihood of case B.

The video crowd action analysis unit 31 adjusts or switches the parameters or algorithm of video analysis based on, for example, the event classification information, in video-based crowd analysis. In detail, the video crowd action analysis unit 31 adjusts or switches the parameters or algorithm for analyzing crowd movement.

In case A, the movement of scattering in a group needs to be detected. In this case, the video crowd action analysis unit 31 determines the movement of scattering in a group using, for example, a discriminator for detecting a scattering movement pattern. In case A, only the tendency of overall movement at the scene needs to be determined, and the movement of each individual person is not so important. The video crowd action analysis unit 31 accordingly adjusts the parameters of video analysis so as to analyze the tendency of overall movement. For example, the video crowd action analysis unit 31 decreases the spatial resolution of motion analysis so that the entire screen can be analyzed evenly. Here, the video crowd action analysis unit 31 may gradually set the resolution of motion analysis from rough to fine, depending on computational resources. In a situation such as case A, the abnormal state is captured by many cameras in the surroundings. This means the action analysis device needs more computational resources than in normal time. The video crowd action analysis unit 31 therefore adjusts computational resources allocated to video analysis of each camera so as to prevent a situation where computational resources are used only for the process of a specific camera and video captured by other cameras is unable to be analyzed. For example, the video crowd action analysis unit 31 reduces the frame rate of analysis of each camera.

In case B, on the other hand, the movement of a suspect running in the opposite direction or running fast needs to be detected and tracked. The video crowd action analysis unit 31 accordingly adjusts the parameters of video analysis so that the movement of an individual person can be accurately tracked. For example, the video crowd action analysis unit 31 increases the frame rate or the spatial resolution to thereby enhance the reliability of the extracted movement. In the case where a part with movement that differs from other parts is detected, the video crowd action analysis unit 31 may start a module of a process of analyzing the detected part to analyze only the part in more detail.

In the case where the video crowd action analysis unit 31 receives the likelihood information of each of case A and case B from the event classification unit 33, the video crowd action analysis unit 31 may set the parameters of motion analysis to values corresponding to the likelihoods of both cases, based on the likelihood information. For example, the video crowd action analysis unit 31 may control the spatiotemporal resolution of motion analysis according to the likelihood information.

Specific examples of parameter adjustment depending on the likelihoods of case A and case B are described below.

The video crowd action analysis unit 31 adjusts the spatial resolution (image size), density, or frame rate for calculating optical flow, depending on the likelihoods of case A and case B. The density is a parameter used to determine whether optical flow is calculated per pixel or per several pixels. The video crowd action analysis unit 31 also switches the algorithm used to calculate optical flow, depending on the likelihoods of case A and case B.

For example, the video crowd action analysis unit 31 adjusts the parameters of video analysis as follows.

In case A where a pattern of overall abnormal movement is detected, the video crowd action analysis unit 31 determines the parameters based on the following policies.

(1) Optical flow is viewed evenly as a whole.
(2) The time resolution and the spatial resolution are not increased.
(3) The frame rate is decreased in the case of overload.

In case B where a specific person with abnormal movement is tracked, the video crowd action analysis unit 31 determines the parameters based on the following policies.

(1) The time resolution and the spatial resolution are both increased.
(2) Optical flow does not need to be viewed as a whole, as long as the movement of a person coming from the direction of the microphone (i.e. the direction in which the acoustic event is detected) can be detected. The time resolution and the spatial resolution are increased to enable particularly detailed analysis in the direction.

The video crowd action analysis unit 31 determines parameter values in each case beforehand according to the above-mentioned policies, and adjusts the parameters depending on the likelihoods of case A and case B as follows.

Suppose, in the normal state, the video crowd action analysis unit 31 sets the spatial resolution to $\alpha_0$ times that of the original image, and calculates flow per $n_0$ pixels. Also suppose the frame rate in the normal state is $f_0$.

These parameters in the case where the event is determined as case A are denoted by $\alpha_A$, $n_A$, and $f_A$, and these parameters in the case where the event is determined as case B are denoted by $\alpha_B$, $n_B$, and $f_B$. The video crowd action analysis unit 31 calculates the parameters in the following manner as an example, where $p_A$ and $p_B$ ($0 \leq p_A \leq 1$, $0 \leq p_B \leq 1$) are respectively the likelihoods of case A and case B.

[Spatial Resolution]

$$\alpha = \alpha_0 + (\alpha_A - \alpha_0)p_A + (\alpha_B - \alpha_0)p_B \qquad \text{[Math. 7]}$$

[Pixel Interval at which Optical Flow is Calculated]

$$n = n_0 + (n_A - n_0)p_A + (n_B - n_0)p_B \qquad \text{[Math. 8]}$$

Here, the density may be biased depending on the likelihood of case B.

[Frame Rate]

$$f = f_0 + (f_A - f_0)p_A + (f_B - f_0)p_B \qquad \text{[Math. 9]}$$

Moreover, several levels of calculation algorithm may be provided so that the video crowd action analysis unit 31 switches the level of calculation algorithm depending on the values of $p_A$ and $p_B$.

Although linear control is described here, the video crowd action analysis unit 31 may perform nonlinear control. For example, the frame rate can be expressed in generalized form as follows.

$$f=F(p_A,p_B) \text{ where } f_0=F(0,0), f_A=F(1,0), f_B=F(0,1) \quad \text{[Math. 10]}$$

Here, $F(p_A, p_B)$ is a function of calculating the frame rate. Not only linear functions but various functions may be used as $F(p_A, p_B)$.

The video crowd action analysis unit 31 may change the extracted feature value depending on the type of the crowd action case so that, for example, a feature value other than movement is extracted. The video crowd action analysis unit 31 may change a dictionary (patterns of movement to be detected) in the discriminator.

As described above, in this exemplary embodiment, the event classification unit 33 classifies the event type of the crowd action, and the video crowd action analysis unit 31 adjusts or switches the parameters or algorithm of video crowd action analysis based on the classification result. This enables more accurate analysis of the crowd action, and also contributes to efficient use of computational resources. Even in the case where a plurality of cameras are present, computational resources can be appropriately allocated for video analysis of each camera. With the method described in PTL 3, on the other hand, acoustic analysis and image analysis are performed independently of each other, and therefore the parameters of image analysis cannot be changed using the acoustic analysis result. This may cause computational resources to be consumed more than necessary. Besides, with the method described in PTL 3, there is a possibility that computational resources are used only for the process of a specific camera and video captured by other cameras is unable to be analyzed.

Figure 4:
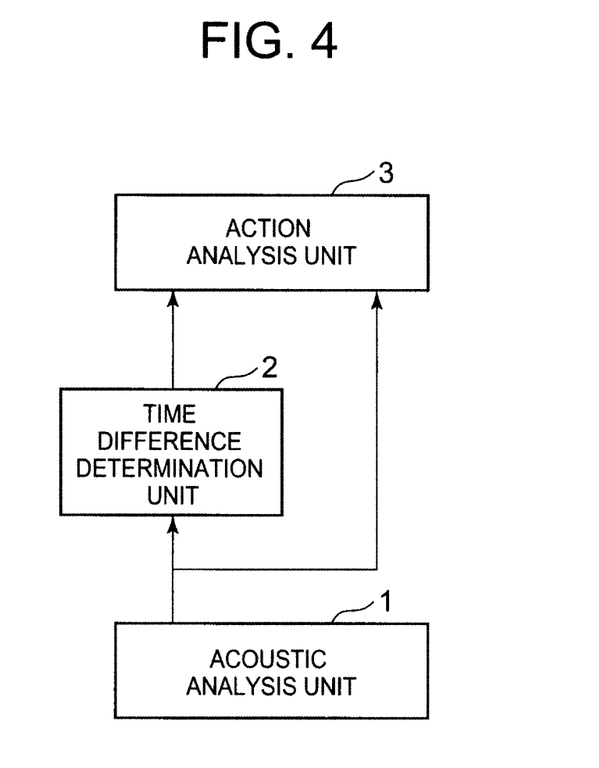
FIG. 4 It is a block diagram schematically depicting an action analysis device according to the present invention.

An overview of the present invention is given below. FIG. 4 is a block diagram schematically depicting an action analysis device according to the present invention. As depicted in FIG. 4, the action analysis device includes: an acoustic analysis unit 1 (corresponding to the speech and acoustic analysis unit 10 in FIG. 1) for analyzing input acoustic information, and generating acoustic analysis information indicating a feature of the acoustic information; a time difference determination unit 2 (corresponding to the time difference determination unit 20 in FIG. 1) for determining a time difference between when an acoustic event identified by the acoustic analysis information occurs and when an event corresponding to the acoustic event occurs in input video obtained by capturing an image of a crowd, and generating time difference information indicating the time difference; and an action analysis unit 3 (corresponding to the crowd action analysis unit 30 in FIG. 1) for analyzing an action of the crowd corresponding to the acoustic event, using the input video, the acoustic analysis information, and the time difference information.

The time difference information may be information indicating a distribution of the time difference determined by the time difference determination unit. According to this aspect, the crowd action can be analyzed even in the case where the time difference is not a single value but a distribution having a predetermined width, that is, the time difference (estimate) determined by the time difference determination unit 2 varies.

The action analysis unit 3 may analyze the action of the crowd, based on the input video obtained after a time equivalent to the time difference has elapsed from the occurrence of the acoustic event. With such a structure, even in the case where the time at which abnormality is detected in the acoustic information and the time at which abnormality is detected in the video information are different, the abnormal action of the crowd can be detected more reliably.

The action analysis unit 3 may calculate a probability of occurrence of an event based on the acoustic analysis information, calculate a probability of occurrence of the event based on the input video obtained after a time equivalent to the time difference has elapsed from the occurrence of the acoustic event, and determine whether or not the action of the crowd is abnormal based on each of the calculated probabilities. With such a structure, the abnormal state of the crowd can be determined from the result of integrating the acoustic analysis result and the video analysis result in consideration of the time difference. For example, by determining whether or not the crowd action is abnormal using the value obtained by integrating the calculated probabilities and a preset threshold, the abnormality of the crowd action can be determined more accurately.

The time difference determination unit 2 may determine the time difference between when the acoustic event occurs and when the event corresponding to the acoustic event occurs in the input video, based on a distance between a position where the acoustic information is acquired and an imaging area captured in the input video. With such a structure, the time difference between the acoustic event and the video event can be calculated depending on the positions of the microphone and camera.

The time difference determination unit 2 may calculate the time difference, based on a distance between a position where the acoustic information is acquired and an imaging area captured in the input video and an acoustic feature indicated by the acoustic analysis information. With such a structure, the time difference between the acoustic event and the video event can be calculated more accurately based on the loudness or type of the sound indicated by the acoustic analysis information. The time difference determination unit 2 can thus calculate the time difference in consideration of the loudness or type of the sound received by the microphone.

The action analysis unit 3 (corresponding to the crowd action analysis unit 30 in FIG. 3) may classify an event type of the action of the crowd based on the acoustic analysis information, generate event classification information indicating a result of the classification, and perform, based on the event classification information, at least one of a process of adjusting a parameter used for analyzing the action of the crowd and a process of switching an algorithm used for analyzing the action of the crowd. With such a structure, the parameter or algorithm of video crowd action analysis can be adjusted or switched depending on the event type of the crowd action. This enables more accurate analysis of the crowd action, and also contributes to efficient use of computational resources. Even in the case where a plurality of cameras are present, computational resources can be appropriately allocated for video analysis of each camera.

The action analysis unit 3 may calculate a likelihood of a specific event, as the event classification information. With such a structure, even in the case where the event type of the crowd action is unable to be exactly classified, the parameter or algorithm of video crowd action analysis can be adjusted or switched depending on the event of the crowd action.

The action analysis unit 3 may include, in a crowd action determination result, a result of analyzing the action of the crowd and an instruction to a predetermined device to execute a predetermined operation, and output the crowd action determination result to the predetermined device. With such a structure, for example, an alert can be issued to a security office. Moreover, the crowd action determination result can be output to, for example, a device for controlling an emergency door to thereby open an emergency exit. In addition, an image of a camera that is likely to capture a possible suspect can be output to a display device in the security office. Furthermore, the direction, zoom factor, etc. of the camera can be controlled to facilitate the capturing of the face of the possible suspect.

The foregoing exemplary embodiments may be partly or wholly described in the following supplementary notes, though the present invention is not limited to such.

(Supplementary note 1) An action analysis device including: an acoustic analysis unit which analyzes input acoustic information, and generates acoustic analysis information indicating a feature of the acoustic information; a time difference determination unit which determines a time difference between when an acoustic event identified by the acoustic analysis information occurs and when an event corresponding to the acoustic event occurs in input video obtained by capturing an image of a crowd, and generating time difference information indicating the time difference; and an action analysis unit which analyzes an action of the crowd corresponding to the acoustic event, using the input video, the acoustic analysis information, and the time difference information.

(Supplementary note 2) The action analysis device according to supplementary note 1, wherein the time difference information is information indicating a distribution of the time difference determined by the time difference determination unit.

(Supplementary note 3) The action analysis device according to supplementary note 1 or 2, wherein the action analysis unit analyzes the action of the crowd, based on the input video obtained after a time equivalent to the time difference has elapsed from the occurrence of the acoustic event.

(Supplementary note 4) The action analysis device according to any one of supplementary notes 1 to 3, wherein the action analysis unit calculates a probability of occurrence of an event based on the acoustic analysis information, calculates a probability of occurrence of the event based on the input video obtained after a time equivalent to the time difference has elapsed from the occurrence of the acoustic event, and determines whether or not the action of the crowd is abnormal based on each of the calculated probabilities.

(Supplementary note 5) The action analysis device according to any one of supplementary notes 1 to 4, wherein the time difference determination unit determines the time difference between when the acoustic event occurs and when the event corresponding to the acoustic event occurs in the input video, based on a distance between a position where the acoustic information is acquired and an imaging area captured in the input video.

(Supplementary note 6) The action analysis device according to any one of supplementary notes 1 to 5, wherein the time difference determination unit calculates the time difference, based on a distance between a position where the acoustic information is acquired and an imaging area captured in the input video and an acoustic feature indicated by the acoustic analysis information.

(Supplementary note 7) The action analysis device according to any one of supplementary notes 1 to 6, wherein the action analysis unit classifies an event type of the action of the crowd based on the acoustic analysis information, generates event classification information indicating a result of the classification, and performs, based on the event classification information, at least one of a process of adjusting a parameter used for analyzing the action of the crowd and a process of switching an algorithm used for analyzing the action of the crowd.

(Supplementary note 8) The action analysis device according to supplementary note 7, wherein the action analysis unit calculates a likelihood of a specific event, as the event classification information.

(Supplementary note 9) The action analysis device according to any one of supplementary notes 1 to 8, wherein the action analysis unit includes, in a crowd action determination result, a result of analyzing the action of the crowd and an instruction to a predetermined device to execute a predetermined operation, and outputs the crowd action determination result to the predetermined device.

(Supplementary note 10) An action analysis method including: analyzing input acoustic information, and generating acoustic analysis information indicating a feature of the acoustic information; determining a time difference between when an acoustic event identified by the acoustic analysis information occurs and when an event corresponding to the acoustic event occurs in input video obtained by capturing an image of a crowd, and generating time difference information indicating the time difference; and analyzing an action of the crowd corresponding to the acoustic event, using the input video, the acoustic analysis information, and the time difference information.

(Supplementary note 11) The action analysis method according to supplementary note 10, wherein the time difference information is information indicating a distribution of the determined time difference.

(Supplementary note 12) The action analysis method according to supplementary note 10 or 11, wherein the action of the crowd is analyzed based on the input video obtained after a time equivalent to the time difference has elapsed from the occurrence of the acoustic event.

(Supplementary note 13) The action analysis method according to any one of supplementary notes 10 to 12, wherein a probability of occurrence of an event is calculated based on the acoustic analysis information, a probability of occurrence of the event is calculated based on the input video obtained after a time equivalent to the time difference has elapsed from the occurrence of the acoustic event, and whether or not the action of the crowd is abnormal is determined based on each of the calculated probabilities.

(Supplementary note 14) The action analysis method according to any one of supplementary notes 10 to 13, wherein the time difference between when the acoustic event occurs and when the event corresponding to the acoustic event occurs in the input video is determined based on a distance between a position where the acoustic information is acquired and an imaging area captured in the input video.

(Supplementary note 15) The action analysis method according to any one of supplementary notes 10 to 14, wherein the time difference is calculated based on a distance between a position where the acoustic information is acquired and an imaging area captured in the input video and an acoustic feature indicated by the acoustic analysis information.

(Supplementary note 16) The action analysis method according to any one of supplementary notes 10 to 15, wherein an event type of the action of the crowd is classified based on the acoustic analysis information, event classification information indicating a result of the classification is generated, and at least one of a process of adjusting a parameter used for analyzing the action of the crowd and a process of switching an algorithm used for analyzing the action of the crowd is performed based on the event classification information.

(Supplementary note 17) The action analysis method according to supplementary note 16, wherein a likelihood of a specific event is calculated as the event classification information.

(Supplementary note 18) The action analysis method according to any one of supplementary notes 10 to 17, wherein a result of analyzing the action of the crowd and an instruction to a predetermined device to execute a predetermined operation are included in a crowd action determination result, and the crowd action determination result is output to the predetermined device.

(Supplementary note 19) An action analysis program for causing a computer to execute: a process of analyzing input acoustic information, and generating acoustic analysis information indicating a feature of the acoustic information; a process of determining a time difference between when an acoustic event identified by the acoustic analysis information occurs and when an event corresponding to the acoustic event occurs in input video obtained by capturing an image of a crowd, and generating time difference information indicating the time difference; and a process of analyzing an action of the crowd corresponding to the acoustic event, using the input video, the acoustic analysis information, and the time difference information.

(Supplementary note 20) The action analysis program according to supplementary note 19, wherein the time difference information is information indicating a distribution of the determined time difference.

(Supplementary note 21) The action analysis program according to supplementary note 19 or 20, causing the computer to execute a process of analyzing the action of the crowd, based on the input video obtained after a time equivalent to the time difference has elapsed from the occurrence of the acoustic event.

(Supplementary note 22) The action analysis program according to any one of supplementary notes 19 to 21, causing the computer to execute a process of calculating a probability of occurrence of an event based on the acoustic analysis information, calculating a probability of occurrence of the event based on the input video obtained after a time equivalent to the time difference has elapsed from the occurrence of the acoustic event, and determining whether or not the action of the crowd is abnormal based on each of the calculated probabilities.

(Supplementary note 23) The action analysis program according to any one of supplementary notes 19 to 22, causing the computer to execute a process of determining the time difference between when the acoustic event occurs and when the event corresponding to the acoustic event occurs in the input video, based on a distance between a position where the acoustic information is acquired and an imaging area captured in the input video.

(Supplementary note 24) The action analysis program according to any one of supplementary notes 19 to 23, causing the computer to execute a process of calculating the time difference, based on a distance between a position where the acoustic information is acquired and an imaging area captured in the input video and an acoustic feature indicated by the acoustic analysis information.

(Supplementary note 25) The action analysis program according to any one of supplementary notes 19 to 24, causing the computer to execute a process of classifying an event type of the action of the crowd based on the acoustic analysis information, generating event classification information indicating a result of the classification, and performing, based on the event classification information, at least one of a process of adjusting a parameter used for analyzing the action of the crowd and a process of switching an algorithm used for analyzing the action of the crowd.

(Supplementary note 26) The action analysis program according to supplementary note 25, causing the computer to execute a process of calculating a likelihood of a specific event, as the event classification information.

(Supplementary note 27) The action analysis program according to any one of supplementary notes 19 to 26, causing the computer to execute a process of including, in a crowd action determination result, a result of analyzing the action of the crowd and an instruction to a predetermined device to execute a predetermined operation, and outputting the crowd action determination result to the predetermined device.

Although the present invention has been described with reference to the foregoing exemplary embodiments and examples, the present invention is not limited to the foregoing exemplary embodiments and examples. Various changes understandable by those skilled in the art within the scope of the present invention can be made to the structures and details of the present invention.

This application claims priority based on Japanese Patent Application No. 2013-093215 filed on Apr. 26, 2013, the disclosure of which is incorporated herein in its entirety.

REFERENCE SIGNS LIST

| | |
|---|---|
| 1 | acoustic analysis unit |
| 2, 20 | time difference determination unit |
| 3 | action analysis unit |
| 10 | speech and acoustic analysis unit |
| 30 | crowd action analysis unit |
| 31 | video crowd action analysis unit |
| 32 | analysis result integration unit |
| 33 | event classification unit |

The invention claimed is:

1. An action analysis devices comprising: a memory storing instructions, a microphone, a video camera, and one or more processors configured to execute the instructions to perform operations for action analysis, the operations including:
analyzing input acoustic information obtained from the microphone, and generating acoustic analysis information indicating a feature of the acoustic information;
determining a time difference between when an acoustic event identified by the acoustic analysis information occurs and when an event corresponding to the acoustic event occurs in input video obtained by capturing an image of a crowd with the video camera, wherein the video camera is located separate from the microphone;
analyzing an action of the crowd corresponding to the acoustic event based on the input video, the acoustic analysis information, and the time difference, and
outputting result of said crowd action analysis;
wherein determining the time difference includes determining the time difference based on time difference modeling information, the time difference modeling information being information for modeling a time difference between when an acoustic event occurs and when a video event occurs based on a distance between a position where the microphone is installed and a position monitored by the camera.

2. The action analysis device according to claim 1, wherein determining the time difference further includes:
generating time difference information that is information indicating a distribution of the determined time difference, and
wherein analyzing the action of the crowd corresponding to the acoustic event includes analyzing based on the input video, the acoustic analysis information, and the time difference information.

3. The action analysis device according to claim 1, wherein analyzing the action of the crowd includes analyzing based on the input video obtained after a time equivalent to the time difference has elapsed from the occurrence of the acoustic event.

4. The action analysis device according to claim 1, wherein analyzing the action of the crowd includes:
calculating a probability of occurrence of an event based on the acoustic analysis information;
calculating a probability of occurrence of the event based on the input video obtained after a time equivalent to the time difference elapsed from the occurrence of the acoustic event;
determining whether or not the action of the crowd is abnormal based on the calculated probabilities.

5. The action analysis device according to claim 1, wherein determining the time difference between when the acoustic event occurs and when the event corresponding to the acoustic event occurs in the input video includes determining based on a distance between a position where the acoustic information is acquired and an imaging area captured in the input video.

6. The action analysis device according to claim 1, wherein determining the time difference includes determining based on a distance between a position where the acoustic information is acquired and an imaging area captured in the input video and an acoustic feature indicated by the acoustic analysis information.

7. The action analysis device according to claim 1, wherein analyzing the action of the crowd includes:
classifying an event type of the action of the crowd based on the acoustic analysis information;
generating event classification information indicating a result of the classification; and
performing, based on the event classification information, at least one of a process of adjusting a parameter used for analyzing the action of the crowd, or a process of switching an algorithm used for analyzing the action of the crowd.

8. The action analysis device according to claim 7, wherein analyzing the action of the crowd includes calculating a likelihood of a specific event as the event classification information.

9. The action analysis device according to claim 1, wherein:
analyzing the action of the crowd further includes obtaining a result of analyzing the action of the crowd,
outputting the result of the crowd action analysis includes outputting the result of the crowd action analysis to a predetermined device to execute a predetermined operation.

10. An action analysis method, comprising:
analyzing input acoustic information obtained from a microphone, and generating acoustic analysis information indicating a feature of the acoustic information;
determining a time difference between when an acoustic event identified by the acoustic analysis information occurs and when an event corresponding to the acoustic event occurs in input video obtained by capturing an image of a crowd with a video camera, wherein the video camera is located separate from the microphone;
analyzing an action of the crowd corresponding to the acoustic event, using the input video, the acoustic analysis information, and the time difference, and
outputting result of said crowd action analysis;
wherein determining the time difference includes determining the time difference based on time difference modeling information, the time difference modeling information being information for modeling a time difference between when an acoustic event occurs and when a video event occurs based on a distance between a position where the microphone is installed and a position monitored by the camera.

11. A non-transitory computer-readable medium storing an action analysis program which, when executed by one or more processors, cause the one or more processors to perform operations for action analysis, the operations comprising:
analyzing input acoustic information obtained from a microphone, and generating acoustic analysis information indicating a feature of the acoustic information;
determining a time difference between when an acoustic event identified by the acoustic analysis information occurs and when an event corresponding to the acoustic event occurs in input video obtained by capturing an image of a crowd with a video camera, wherein the video camera is located separate from the microphone;
analyzing an action of the crowd corresponding to the acoustic event based on the input video, the acoustic analysis information, and the time difference, and
outputting result of said crowd action analysis;
wherein determining the time difference includes determining the time difference based on time difference modeling information, the time difference modeling information being information for modeling a time difference between when an acoustic event occurs and when a video event occurs based on a distance between a position where the microphone is installed and a position monitored by the camera.

\* \* \* \* \*

UNITED STATES PATENT AND TRADEMARK OFFICE
CERTIFICATE OF CORRECTION

PATENT NO. : 9,761,248 B2  
APPLICATION NO. : 14/786931  
DATED : September 12, 2017  
INVENTOR(S) : Oami et al.

It is certified that error appears in the above-identified patent and that said Letters Patent is hereby corrected as shown below:

In the Claims

Claim 3, Column 19, Line 16, "time difference has elapsed from" should read -- time difference elapsed from --.

Signed and Sealed this  
Sixteenth Day of January, 2018

Joseph Matal  
*Performing the Functions and Duties of the*  
*Under Secretary of Commerce for Intellectual Property and*  
*Director of the United States Patent and Trademark Office*